A. T. HEFLIN.
Cultivator.
No. 82,406.  Patented Sept. 22, 1868.
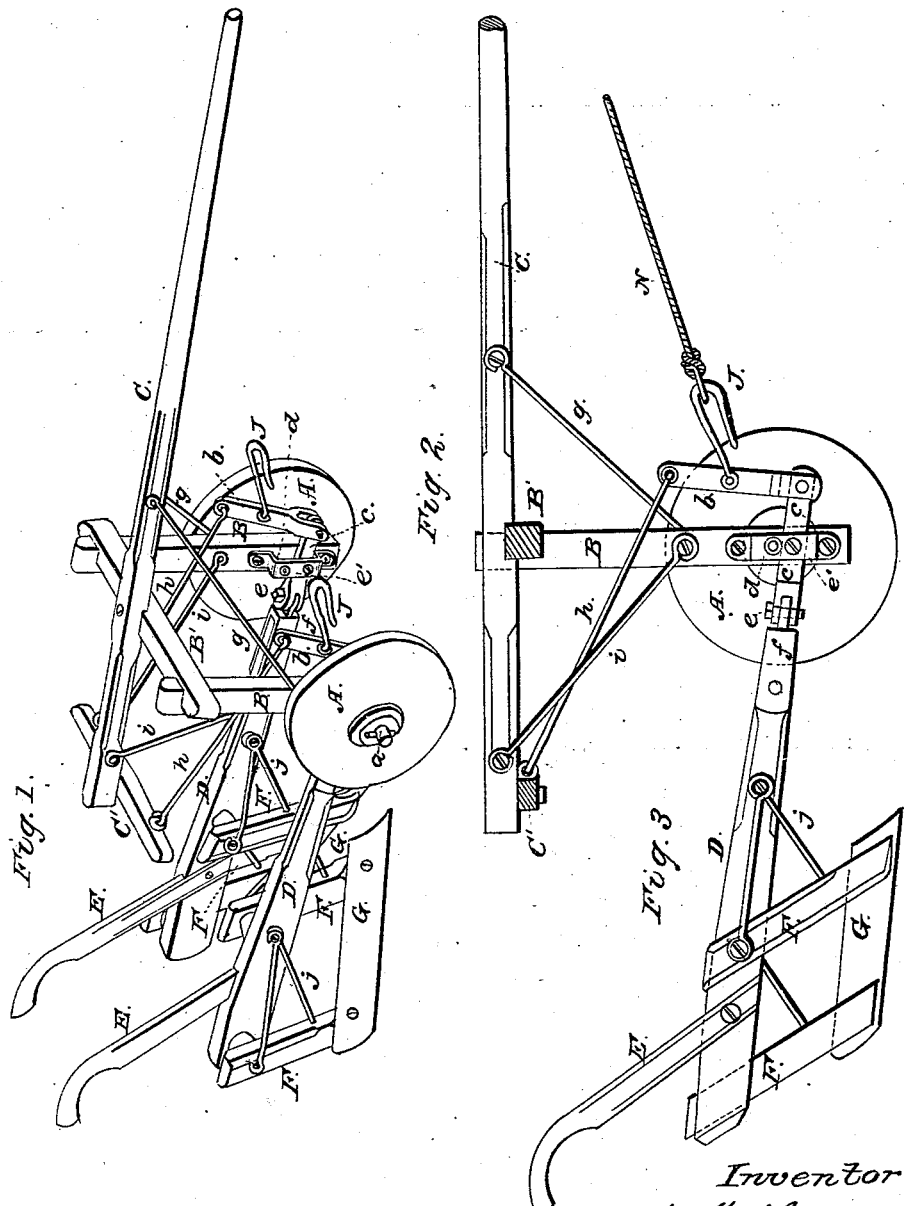

United States Patent Office.

ARCHABALD T. HEFLIN, OF MONMOUTH, ILLINOIS.

Letters Patent No. 82,406, dated September 22, 1868.

IMPROVEMENT IN CULTIVATORS.

*The Schedule referred to in these Letters Patent and making part of the same.*

TO ALL WHOM IT MAY CONCERN:

Be it known that I, ARCHABALD T. HEFLIN, of Monmouth, in the county of Warren, and State of Illinois, have invented a new Mode of Attaching Scrapers to Cultivators; and I do hereby declare that the following is a full, clear, and exact description thereof, reference being had to the accompanying drawings, making a part of this specification, in which—

Figure 1 is a perspective view of the improved implement, showing the scrapers arranged for scraping and throwing earth and weeds from the plants.

Figure 2 is a longitudinal section, taken in a vertical plane through the implement.

Similar letters of reference indicate corresponding parts in the two figures.

This invention relates to improvements on implements which are designed for clearing young plants of weeds, and also for throwing earth to plants.

The nature of my invention consists in attaching the beams of two scrapers to a two-wheel elevated draught-frame, by means of vertical and horizontal joints, which will allow an attendant behind the machine to guide and control the scrapers as he may require, and in combining with such features certain means whereby the draught of the team will be equally distributed upon both scrapers, while, at the same time, it will operate to keep the scrapers down to their work, as will be hereinafter explained.

To enable others skilled in the art to understand my invention, I will describe its construction and operation.

In the accompanying drawings, A A represent two transporting-wheels, which are applied on two short axles, $a$, that project laterally from the sides of two vertical beams, B. These two beams B B are connected together, at their upper ends, by a horizontal cross-beam, B', to the middle of the length of which the draught-pole C is rigidly secured in any suitable manner. The rear end of the draught-pole extends some distance in rear of the cross-beam B', to which it is attached, and is braced by means of rods $g\ g$ and $i\ i$, which are secured to the vertical beams B B, as shown in fig. 1.

To the bottom side of the draught-pole C a double-tree, C', is pivoted, so as to vibrate freely, and to the ends of this double-tree, at equal distances from its pivot, rods $h\ h$ are connected, by eyes and hooks. These rods extend forward and downward, and are attached, by loose connections, to two links, $b\ b$, which are pivoted, at their lower ends, to short levers, $c\ c$, so as to vibrate in vertical planes.

The short levers $c\ c$ are pivoted, at $c'$, between the staples $d$ and vertical beams B, to which said staples are rigidly secured. By having several extra holes through the staples $d$ and beams B, the pivotal connections or fulcra of the short levers can be adjusted higher or lower, as may be required.

To the rear forked ends of the short levers $c\ c$, the front ends of beams D D are pivoted, by means of vertical pins, $e$, which allow the rear ends of said beams to vibrate laterally.

Each one of the beams D is provided with a handle, E, and two standards, F F, which latter are arranged on opposite sides of their beam, near the rear end thereof, and are braced by rods, $j\ j$, which will resist all backward strain upon the standards.

One of the standards F of each beam D is arranged forward of the other standard, and to their lower ends a scraping-plate, G, is suitably secured, which plate is oblique to the beam D, so as to scrape weeds and trash from the roots of plants toward the centre of the rows of plants, when arranged as shown in fig. 1. For the purpose of earthing-up or throwing earth about the roots of plants, the scrapers, with their beams, are reversed, so that the scraping-blades will stand in opposite directions to those shown in the drawings.

At intermediate points between the extremities of the upright links $b\ b$, hooks J J are pivoted or loosely linked, to which hooks the draught-chains or ropes N are attached, for the purpose of causing the team to draw the machine by said links.

It will be seen, from the above description, that, by means of the vertical pivot-connections $e\ e$ and the horizontal pivot-connections $c'$, the scrapers are allowed to be moved laterally, obliquely, and vertically; and it will be seen that, by the draught-attachments, the tendency will be to draw down the front ends of the scraperbeams, and keep them down while working the machine, while, at the same time, the draught of the team will be equally distributed upon both sides thereof, and upon both scrapers.

It will also be seen that the beam B' and draught-pole are raised so high from the ground as to pass freely over plants which may have attained considerable growth, the wheels A A running in the furrows, between the rows of plants.

Having described my invention, what I claim as new, and desire to secure by Letters Patent, is—

1. A two-wheeled elevated draught-frame, with a draught-pole, C, secured upon the cross-beam B' of said frame A, swivelling double-tree C', applied to the draught-pole, and connected to links $b\ b$, in combination with levers $c$ and scraper-carrying beams D D, all combined, arranged, and operating substantially as described.

2. The attaching-hooks J J, applied to links $b$, which are connected to the double-tree C' and to levers $c\ c$, said parts being employed in a machine constructed and operating substantially as described.

ARCHABALD T. HEFLIN.

Witnesses:
   ELISHA NYE,
   JOSEPH McINTIRE.